Dec. 15, 1970  J. ANTHES  3,547,529
CARTRIDGE FOR AUDIO-VISUAL PROJECTOR AND PROJECTOR
ARRANGEMENT USING THAT CARTRIDGE
Filed March 21, 1968
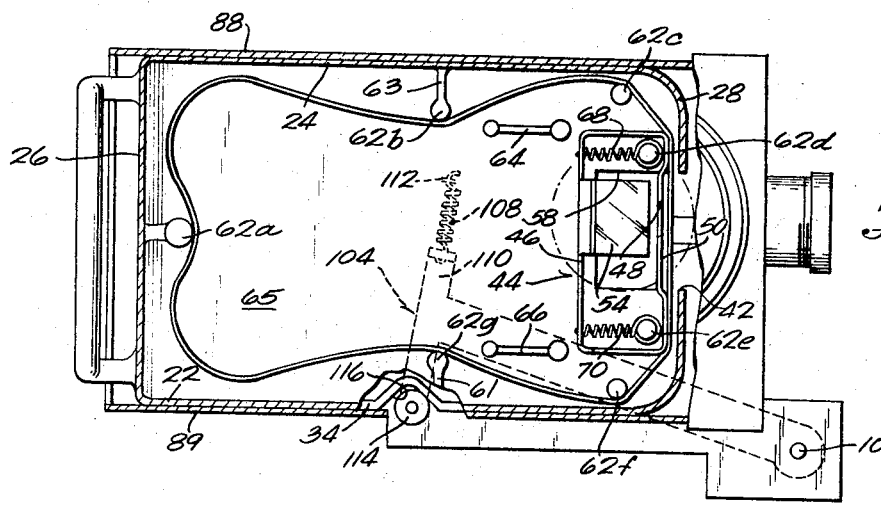
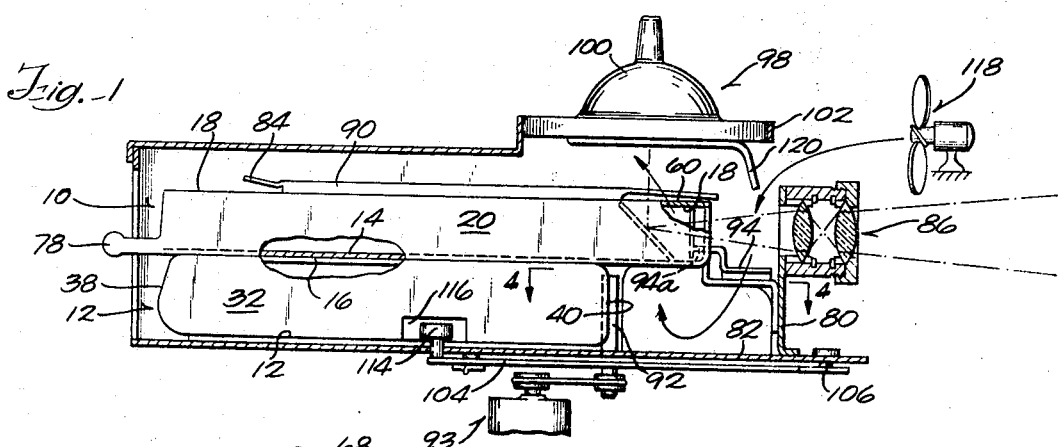
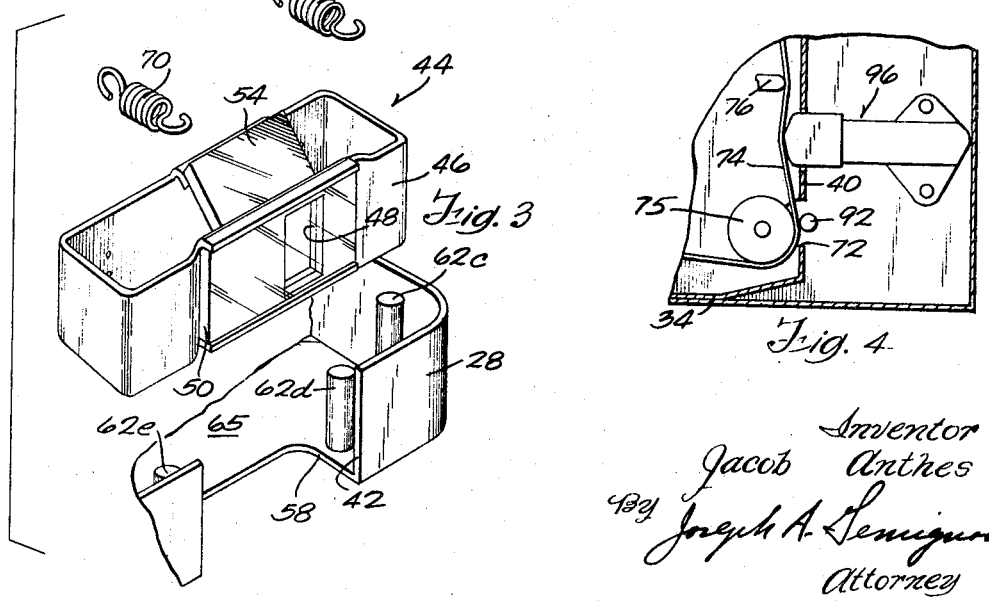
Inventor
Jacob Anthes
By Joseph A. Genuini
Attorney

United States Patent Office 3,547,529
Patented Dec. 15, 1970

3,547,529
CARTRIDGE FOR AUDIO-VISUAL PROJECTOR AND PROJECTOR ARRANGEMENT USING THAT CARTRIDGE
Jacob Anthes, Delafield, Wis., assignor to La Belle Industries, Inc., Oconomowoc, Wis., a corporation of Wisconsin
Filed Mar. 21, 1968, Ser. No. 714,836
Int. Cl. G03b 31/04, 23/02
U.S. Cl. 352—31     14 Claims

ABSTRACT OF THE DISCLOSURE

A cartridge for an audio-visual projector having film strip and sound tape housings combined into a unitary cartridge housing. In the area of the film aperture the film strip housing extends beyond the sound tapehousing to thereby expose that area for cooling at that point. A film strip support and projection mirror are connected for joint movement and the film strip support is so spaced relative to the sound tape pressure roll as to insure adequate engagement of both the film strip with the film advance and the pressure roller with a drive capstan. The film strip is referenced in the cartridge so that it will have the requisite orientation with the film advance when the cartridge is located in the projector.

BACKGROUND OF INVENTION

Field of invention

This invention relates to audio-visual propjectors and, more particularly, to an improved cartridge for such projectors.

Description of prior art

The use and acceptance of audio-visual projectors are well recognized and numerous and varied proposals have been made for arrangements of the film strip and sound tape in such projectors. A common practice is to provide a cartridge sound tape and a companion, but separate, film strip. In many arrangements the film strip is not in cartridge form although there have been proposals to that end. There have also been proposals for arranging the film strip and sound tape in a unitary cartridge assembly.

Separate sound tape and film strip arrangements present problems of handling and synchronization. Previously proposed unitary film and sound cartridges have not offered a complete solution for a number of reasons among which are the difficulty of achieving and maintaining adequate focus and deterioration due to exposure to excessive temperatures resulting from, for example, heat generated by the projection lamp.

SUMMARY OF INVENTION

A general object of this invention is to provide a simplified and improved integral cartridge including both the film strip and sound tape for an audio-visual projector or the like. For the achievement of this and other objects, an integral cartridge assembly is proposed which contains both a film strip and sound tape. In the area of the film aperture, the cartridge is provided with an opening to accommodate a stream of cooling air through that area to prevent excessive temperature buildup due to, for example, the projector lamp. The sound tape housing is spaced laterally from this area so that cooling air can flow freely in the area and thereby minimize the temperature rise and the adverse effect high temperatures might have on the film strip and sound tape housings and the film strip and sound tape as well.

In the projector the distance between the film support, in its normal position, and the drive capstan engaging portion of the sound pressure roller is greater than the distance between the pressure roller engaging surface of the capstan and the film strip engaging portion of the film advance. After initial engagement between the film advance and the film, and its support, the cartridge is capable of additional limited movement with the film strip support being displaced from its normal position to insure adequate engagement between the capstan and pressure roller as well as between the film strip and film advance.

Preferably the film strip support at the film aperture is connected for joint movement with a portion of the projection system which directs light through the film strip. The portion of the projection system then moves jointly with the film strip support and the film to thereby maintain proper focus as the film may be displaced by the film advance.

DESCRIPTION OF DRAWINGS

FIG. 1 is a side view of the cartridge partially in section and illustrated in connection with a portion of a projector;

FIG. 2 is a top view of the cartridge with portions broken away to expose the interior of the film strip housing;

FIG. 3 is an exploded perspective view of the film support assembly of the film strip housing; and FIG. 4 is a section view generally along line 4—4 in FIG. 1 and of a portion of the sound tape housing and playback assembly.

DESCRIPTION OF PREFERRED EMBODIMENT

A cartridge embodying this invention will be discussed in connection with an audio-visual projector and only that portion of the projector will be described which is necessary to an understanding of the invention, a description of all of the projector details not being necessary.

The cartridge includes a film strip housing 19 and a sound tape housing 12 having confronting walls 14 and 16 suitably joined to form a common wall connecting housings 10 and 12 into a unitary cartridge. Film strip housing 10 also includes a base wall 18 and a wall 20 extending around and projecting from base wall 18 to film strip wall 14. As can be seen in FIG. 2, the film strip housing is generally rectangular and wall 20 includes opposed side walls 22 and 24 and end walls 26 and 28. Similarly, sound tape housing 12 includes a base wall 30 and a wall 32 extending from that base wall to sound tape housing wall 16. As is partially illustrated in FIG. 3, the sound tape housing is generally rectangular and includes opposed side walls, only 34 shown in the drawing, and end walls 38 and 40.

Opening 42 is provided in wall 20, specifically in end wall 28 and a film support, aperture and reflecting surface assembly 44 is supported at opening 42. Assembly 44 includes a wall 46 having a cutout portion 48 and a glass plate 50 connected to the wall at cutout 48. The wall also includes a turned tab bracket 52 which supports a mirror 54, the latter providing a light reflecting surface disposed at an angle to glass plate 50. The glass plate serves as a film support and cutout 48 provides a film aperture through which light reflected from mirror 54 is projected through the film and through projection opening 42.

One of the problems normally encountered in a projector is the effect on the cartridge housing and the film strip of self-generated projector heat resulting predominantly from the projector lamp. For example, elevated temperatures can damage the housing and can produce the phenomena generally referred to as film "popping." To alleviate this problem, the film strip housing is provided with an opening in the area of the film aperture and support, the opening being effective to accommodate a cooling stream of air over the film at the film aperture. More specifically, it will be noted that the portion of the film strip housing containing film support assembly 44 projects laterally beyond wall 32 of the sound tape housing. Generally aligned openings 58 and 60 are provided in overhanging portions of walls 18 and 14, respectively, thereby defining a through opening which opens the area of the film aperture and permits a cooling stream of air to flow between the opposed walls 14 and 18 of the film strip housing and over the film strip support and film. Glass is used for member 50 and, as the portion of the film support which directly engages the film, provides a heat sink for more effectively cooling the film strip.

To complete the structure of the film strip housing and the sound tape housing, it will be noted that the film strip housing includes a number of fixed posts 62a–62g and two posts or walls 64 and 66 parallel to and extending along the side walls of the film strip housing. Walls 64 and 66 are positioned between mid-posts 62b, 62g and front posts 62c, 62f. Mid-posts 62b and 62g, with walls 61 and 63 extending between the posts and the side walls 22 and 24, guide the film strip into and out of the film strip storage area 65 generally at the mid-point of the cartridge. The film strip extends between walls 64, 66 and side walls 22, 24 and also between posts 62c, 62f and the cartridge side walls and between glass film support 50 and end wall 28. By leading the film strip into the cartridge storage area at the cartridge mid-point and also withdrawing the film strip from an area at a mid-point, as will be done with this cartridge post arrangement, tension which might otherwise occur in the film strip is substantially relieved and the film strip moves past the film aperture in a relatively stress free condition. Assembly 44 is connected to posts 62d and 62e by springs 68 and 70, the springs bias the film support assembly toward opening 42. This normally holds the assembly against end wall 28 but the assembly is free to move away from the end wall against the bias.

In the sound tape housing, end wall 40 is provided with an opening 72 and sound tape 74, only a portion of which is illustrated in the drawings, extends past openings 72 to and over pressure roller 75. A tensioning post 76 is provided in the housing but spaced from the pressure roller.

A handle 78 is provided on the film strip housing and provides a means of manipulating the cartridge into and out of the projector. This, in a general manner, completes the structure of the cartridge.

The positioning and operation of the cartridge in the projector will now be described. As mentioned above, the entire projector has not been illustrated and only those projector elements directly associated with cartridge operation will be described. A lens bracket 80 is connected to a projector base 82 and supports projection lens 86. A cartridge bracket 84 is also connected to base 82 and includes generally vertical walls 88 and 89 and a horizontal wall 90 defining a cartridge receiving opening with projector wall 82. Drive capstan 92 is positioned at the cartridge receiving area and is connected in a conventional manner to a suitable drive 93. A film shuttle member 94 is spaced from capstan 92. The shuttle is part of a conventional film advance mechanism, which may also be powered from drive 93, and is operative to engage the film sprocket openings to advance the film past aperture 48.

Playback assembly 96 is connected to the projector base at the cartridge receiving area, this assembly is of conventional construction and will not be described in detail and more than one such assembly can be used. A projection lamp assembly 98 including lamp 100 and mounting bracket 102 is supported vertically above the cartridge receiving opening and in the area of the film advance shuttle. Bracket 102 is suitably fixed within the projector housing to orient the projection lamp.

As can be seen in FIG. 1, the openings to the film, the pressure roller and the sound tape all face in a common direction. As cartridge 10 moves into the cartridge receiving opening, i.e. between bracket wall 90 and projector base wall 82, the film strip supported in the film strip assembly is brought into engagement with shuttle 94, pressure roller 75 is brought into engagement with capstan 92 and playback assembly into engagement with tape 74 through opening 72. In order to obtain proper engagement between shuttle 94 and the film strip and between capstan 92 and the pressure roller and thereby insure positive driving of the film strip and sound tape, a specific relationship of the film support with the pressure roller, shuttle 94 and capstan 92 is provided. More specifically, as discussed above, wall 46 to which the actual film support, glass plate 50, is connected is biased by springs 68 and 70 toward projection opening 42 so that the film support is freely movable away from the opening but the springs will always maintain adequate engagement between the film support and the shuttle. With a freely movable film support, the distance between the film support and the capstan engaging surface of pressure roller 75 is made greater than the distance between the film engaging end 94a of the shuttle and the pressure roller engaging portion of capstan 92. Furthermore, the locating mechanism which positions the cartridge in the projector is positioned such that as the cartridge is moved into the cartridge receiving area engagement between shuttle 94 and the film support, and the film thereon, occurs first but the locating mechanism permits additional movement of the cartridge into the area after that engagement and before the cartridge is clamped in its normal operating position. This additional movement insures engagement between capstan 92 and the pressure roller and when that engagement occurs the locking mechanism locates and holds the cartridge in the cartridge receiving area. This arrangement insures effective engagement of the film strip and sound tape for positive driving movement.

The locking arrangement for the cartridge consists of arm 104 pivoted to projector base 82 on pin 106. Spring 108 extends between leg 110 of the arm and an anchor post 112 connected to wall 82. Spring 108 biases lever 104 in a clockwise direction about pin 106. Roller 114 is connected to arm portion 110 and is positioned to fit into a V-shaped notch 116 in side wall 34 of the tape cartridge to locate the cartridge in its operative position and to hold it in that position.

At this point it should again be noted that end wall 40 of the sound tape housing terminates short of the through opening defined in the film housing by openings 58 and 60. With this arrangement the sound tape housing, and the tape supported therein, are spaced from the area of the film aperture and, accordingly, are out of direct alignment with the projector lamp. The sound tape and its housing are not directly exposed to the heat of the projector therby protecting that housing from heat damage and minimizing any effect exposure to high temperatures may have on the playback characteristics of the sound tape. Moreover, this opens the area of the film strip housing at the film aperature to better accommodate an air stream for more effective cooling.

It will be noted that by connecting the mirror 54 to the film support 46 for joint movement therewith, the distance between the mirror and the film aperture is maintained constant. Thus, the film support can be moved by the shuttle and proper focus distance between the mirror and the film aperture is not materially disturbed. In this connection, it will also be noted that the mirror, which is at 45° to the film strip wall 20 and to the general line of projection of light from the lamp, moves generally at right angles to that line of light projection to further contribute to maintaining focus and minimize the effect such movement might otherwise have on projection.

Another feature of the arrangement of the cartridge in the projector is that wall 90 engages base wall 18 of film strip housing 10 and holds the cartridge in engagement with projector base wall 82. This provides an accurate reference point for orienting the film strip with respect to the shuttle. More particularly, the distance between the shuttle end 94a and base wall 82 can be accurately located and the distance between film strip housing base wall 18 and base wall 30 of the sound tape housing can also be accurately maintained so that the inner surface of base wall 18 provides a point of reference for the film strip. In other words, when the film strip engages the inner surface of wall 18 the film sprockets are properly oriented with respect to the shuttle because of the controlled relationship between that inner wall surface and the projector base wall which in turn is accurately located with respect to the film advance shuttle.

In the projector, lamp 100 is positioned directly over the film support assembly and the film aperture. With this arrangement light is directed vertically into through opening 60 onto mirror 54. The mirror is arranged at 45° to the vertical, or aperture 48, and reflects light through the aperture and film and into the lens system for projection. This places the film directly in the area of the lamp for good projection but this also places the film strip in the area of possibly most intense heat generation in the projector. By opening the film strip housing in that area and providing the through opening, a cooling stream of air is effectively accommodated and temperature rise in that area is minimized.

As can be seen in FIG. 1, the cooling stream of air (indicated by the arrows) can be directed through openings 58 and 60 over the film strip at the film aperture. As is conventional in most projectors, cooling fan 118 is provided to direct a stream of air over the projection lamp. In this particular projector the fan directs the air stream horizontally over the lamp and a deflector 120 is connected to braket 102 to direct air flow downwardly toward projector base 82 where it is redirected upwardly through the openings and over the film strip.

A silvered mirror may be utilized in the described embodiment to provide the reflecting surface, but with the disclosed arrangement of the film strip housing overhanging the sound tape housing it is also possible to utilize a dichroic mirror which reflects visible light through the film aperture but allows the infra-red to pass through the mirror. This reduces the amount of heat generated in the film aperture area and with the sound tape housing spaced laterally from that area there is no danger of overheating any elements as a result of the infra-red having passed through.

Although this invention has been illustrated and described in connection with particular embodiments thereof, it will be apparent to those skilled in the art that various changes and modifications may be made therein without departing from the spirit of the invention or from the scope of the appended claims.

I claim:
1. A film strip and sound tape cartridge comprising, in combination:
   a housing including a film strip portion and a sound tape portion,
   means in said film strip portion defining a film aperture,
   means in said film strip portion including a film strip support and operative to support said film strip for movement past said film aperture,
   reflecting means in said housing for projecting light through said film aperture,
   means defining an opening, in addition to said film aperture, in said film strip portion in the area of said film aperture to accommodate a stream of cooling air over said film strip at said film aperture,
   and said sound tape portion laterally offset from said film aperture area so that said film strip portion and said sound tape portion do not overlap in said film aperture area.

2. The cartridge of claim 1:
   wherein said film strip portion includes a projection opening in alignment with said film aperture,
   wherein said film strip support, said reflecting means and film aperture are connected in a jointly movable assembly,
   and including means biasing said jointly movable assembly toward a normal position at said projection opening.

3. The cartridge of claim 2 including a wall generally common to both said film strip and sound tape portions and wherein said film strip portion includes a base wall spaced from said common wall and a side wall extending around said base wall and between said base wall and said common wall,
   said film aperture is in said side wall,
   and including means defining openings in said base wall and said common wall at said projection opening to thereby define said opening for accommodating said air stream.

4. The cartridge of claim 3 in a projector including a pressure roller in said sound tape housing, said projector including:
   a projector lamp,
   projection lens,
   film advance,
   capstan drive means,
   and locating means engageable with said cartridge and operative to position said reflecting means in alignment with said projection lamp through said base wall opening, said projection opening in alignment with said lens, said film advance for engagement with a film strip on said film support, and said capstan drive means in engagement with said pressure roller,
   and wherein said distance between said film advance and pressure roller engaging surface of said capstan drive means is less than the distance between said capstan drive means engaging portion of said pressure roller and said film strip support in said normal position,
   whereby said film advance moves said film strip support against said bias to insure positive engagement of said film advance with a film strip and said capstan drive means with said pressure roller.

5. A cartridge for an audio-visual projector comprising, in combination:
   a film strip housing,
   a sound tape housing connected to said film strip housing to provide an integral cartridge housing,
   said film strip housing overlying said sound tape housing and including a portion projecting laterally beyond said sound tape housing,
   means in said film strip housing defining a film aperture in said laterally projecting portion,
   film support means in said film strip housing including a film strip support and operative to support said film strip for movement past said film aperture,
   and means defining an opening in said film strip housing in said laterally projecting portion in addition to said film aperture and in the area of said film aperture to accommodate a stream of cooling air through said film strip housing over said film strip at said film aperture.

6. A cartridge for an audio-visual projector comprising, in combination:
   a film strip housing,
   a sound tape housing connected to said film strip housing to provide an integral cartridge housing,
   said film strip housing overlying said sound tape housing and including a portion projecting laterally beyond said sound tape housing, means in said film strip housing defining a film aperture,
film support means in said film strip housing including a film strip support and operative to support said film strip for movement past said film aperture,
and means defining an opening in said film strip housing in addition to said film aperture and in the area of said film aperture to accommodate a stream of cooling air through said film strip housing over said film strip at said film aperture,
a wall generally common to both said film strip and sound tape housings,
said film strip housing including a first base wall spaced from said common wall and a first side wall extending around said first base wall and between said first base wall and said common wall,
said sound tape housing including a second base wall spaced from said first base wall and a second side wall extending around said second base wall and between said second base and said common wall,
said film aperture being part of said film support means and arranged in alignment with a projection opening in said first side wall,
said second side wall being inset laterally from said first side wall in the area of said projection opening to thereby define the portion of said film strip housing which projects laterally beyond said sound strip,
and including means defining openings in said first base wall and said common wall at said projection opening to thereby define said opening for accommodating said air stream.

7. The cartridge of claim 6 including reflecting means: wherein said film support, said reflecting means and said film aperture are connected in a jointly movable assembly disposed between said first base wall and common wall openings,
and also including means biasing said jointly movable assembly toward a normal position at said projection opening.

8. The cartridge of claim 7 in a projector including a pressure roller in said sound tape housing, said projector including:
a projection lamp,
projection lens,
film advance,
capstan drive means,
and locating means engageable with said cartridge and operative to position said reflecting means in alignment with said projection lamp, said projection opening in alignment with said lens, said film advance for engagement with a film strip on said film support, and said capstan drive means in engagement with said pressure roller,
and wherein the distance between said film advance and pressure roller engaging surface of said capstan drive means is less than the distance between the capstan drive means engaging portion of said pressure roller and said film strip support when said jointly movable assembly is in said normal position,
whereby said film advance moves said film strip support against said bias to insure positive engagement of said film advance with said film strip and said capstan drive means with said pressure roller.

9. The combination of claim 8 wherein said locating means is arranged relative to film advance and said capstan drive means to afford limited movement of said cartridge relative to said film advance and said pressure roller after initial engagement of said film advance and said film support.

10. The combination of claim 8:
wherein said projector also includes a reference wall engageable with said cartridge and when engaged therewith having a predetermined relation with said first base wall,
and wherein said reference wall has a predetermined spacing from said film advance so that, when said cartridge is positioned in said projector, seating of a film strip in said film strip housing against said first base wall references said film strip with respect to said film advance.

11. The combination of claim 7:
wherein said reflecting means is disposed at an oblique angle to said first base wall and said first side wall to reflect light directed into said first base wall through said film aperture,
and wherein said reflecting means comprises a dichroic mirror.

12. The combination of claim 7:
wherein said projector includes a fan for directing a cooling stream of air over said projection lamp,
and including means for diverting a portion of said air stream to said laterally projecting portion of said film strip housing.

13. A cartridge for an audio-visual projector comprising, in combination:
a film strip housing,
a sound tape housing connected to said film strip housing to provide an integral cartridge housing,
said film strip housing overlying said sound tape housing and including a portion projecting laterally beyond said sound tape housing,
means in said film strip housing defining a film aperture,
film support means in said film strip housing including a film strip support and operative to support said film strip for movement past said film aperture,
and means defining an opening in said film strip housing in addition to said film aperture and in the area of said film aperture to accommodate a stream of cooling air through said film strip housing over said film strip at said film aperture,
said film strip housing including a base wall and a side wall extending around and projecting from said base wall,
a film strip in said housing and a plurality of post means in said film strip housing arranged to guide said film strip, two pairs of said post means arranged one pair adjacent a first side wall portion and the other pair adjacent a side wall portion opposite to said first side wall portion and both pairs located in substantially the mid-area of said film strip housing,
and said film strip extending between the post means of each of said pairs to be guided along said side wall to and from said film support from generally the mid-area of said film strip housing.

14. The combination of claim 13 wherein one of said post means of each pair comprise an elongated wall having an extension along said side wall.

References Cited

UNITED STATES PATENTS

| | | | |
|---|---|---|---|
| 2,853,923 | 9/1958 | Daniel | 352—31 |
| 3,176,580 | 4/1965 | Metz | 353—19 X |
| 3,211,054 | 10/1965 | Schwartz | 352—31 X |
| 3,389,953 | 6/1968 | Gerry | 352—78 |

JOHN M. HORAN, Primary Examiner

DAVID S. STALLARD, Assistant Examiner

U.S. Cl. X.R.

352—72